(12) United States Patent
Kim et al.

(10) Patent No.: US 9,343,025 B2
(45) Date of Patent: May 17, 2016

(54) DISPLAY DEVICE

(71) Applicant: Samsung Display Co., Ltd., Yongin, Gyeonggi-Do (KR)

(72) Inventors: JooYoung Kim, Suwon-si (KR); Gicherl Kim, Asan-si (KR); Junwoo You, Gyeonggi-do (KR); Dongmin Yeo, Asan-si (KR)

(73) Assignee: Samsung Display Co., Ltd. (KR)

( * ) Notice: Subject to any disclaimer, the term of this patent is extended or adjusted under 35 U.S.C. 154(b) by 80 days.

(21) Appl. No.: 14/225,236

(22) Filed: Mar. 25, 2014

(65) Prior Publication Data

US 2014/0292621 A1     Oct. 2, 2014

(30) Foreign Application Priority Data

Apr. 2, 2013 (KR) ........................ 10-2013-0035915

(51) Int. Cl.
*G09G 3/36* (2006.01)
*H04N 5/64* (2006.01)

(52) U.S. Cl.
CPC ............... *G09G 3/3648* (2013.01); *H04N 5/64* (2013.01); *G09G 2310/0232* (2013.01); *G09G 2340/045* (2013.01)

(58) Field of Classification Search
None
See application file for complete search history.

(56) References Cited

U.S. PATENT DOCUMENTS

| | | | |
|---|---|---|---|
| 7,667,786 B2 | 2/2010 | Nouchi et al. | |
| 7,847,912 B2 | 12/2010 | Nishizawa et al. | |
| 7,920,223 B2 | 4/2011 | Nishizawa et al. | |
| 8,139,177 B2 | 3/2012 | Nishizawa | |
| 2009/0091681 A1* | 4/2009 | Nishizawa et al. | 349/58 |
| 2010/0033648 A1 | 2/2010 | Kaganezawa | |
| 2011/0273383 A1 | 11/2011 | Jeon et al. | |
| 2013/0223815 A1* | 8/2013 | Mizobuchi et al. | 386/248 |

FOREIGN PATENT DOCUMENTS

| | | |
|---|---|---|
| JP | 2000-341607 | 12/2000 |
| JP | 2002-229006 | 8/2002 |
| JP | 2010-156784 | 7/2010 |
| KR | 20-1999-0030296 | 7/1999 |
| KR | 10-0435826 | 6/2004 |
| KR | 10-2012-0052766 | 5/2012 |

\* cited by examiner

*Primary Examiner* — Joseph Haley
(74) *Attorney, Agent, or Firm* — Innovation Counsel LLP

(57) ABSTRACT

A display device includes a display module and a protective member that accommodates the display module. The protective member includes a first curved-line part extending in a horizontal direction and curved to have a concave surface on the top, a second curved-line part spaced apart from the first curved-line part to face the first curved-line part, formed below the first curved-line part, extending in the horizontal direction, and have a concave surface on the bottom, and connection parts that connect the first curved-line part and the second curved-line part to define an opening portion through which the portion of a display area is exposed. The display area comprises a display part exposed through the opening portion to display the effective image, a first peripheral part overlapped with the first curved-line part, and a second peripheral part overlapped with the second curved-line part.

19 Claims, 10 Drawing Sheets

DISPLAY DEVICE

CROSS-REFERENCE TO RELATED APPLICATION

This U.S. non-provisional patent application claims priority under 35 U.S.C. §119 to Korean Patent Application No. 10-2013-0035915, filed on Apr. 2, 2013, the contents of which are hereby incorporated by reference in its entirety.

BACKGROUND

1. Field of Disclosure

The present disclosure relates to a display device. More particularly, the present disclosure relates to a display device.

2. Description of the Related Art

A display device has been developed in order to replace a cathode ray tube display device having a relatively large size and high power consumption. As the display device, various display devices, such as an organic light emitting display device, a liquid crystal display device, a plasma display device, etc., have been developed.

In recent years, demands for display devices, which provide three-dimensional effect, sense of immersion and presence, increase. For the three-dimensional effect, a three-dimensional image display device has been developed. For the sense of immersion and presence, a curved display device has been developed.

In the curved display device, some elements are formed in curved shape. The curved display device is manufactured by assembling curved-shaped elements which are separately formed.

SUMMARY

The present disclosure provides a display device capable of providing the sense of immersion and presence.

Embodiments of the inventive concept provide a display device including a display module that includes a display panel to display an effective image in a portion of a display area, and a protective member that accommodates the display module, the protective member including a first curved-line part extending in a horizontal direction and curved to have a concave surface on the top, a second curved-line part spaced apart from the first curved-line part to face the first curved-line part, formed below the first curved-line part, extending in the horizontal direction, and curved to have a concave surface on the bottom, and connection parts that connect the first curved-line part and the second curved-line part to define an opening portion through which the portion of the display area is exposed. The display area comprises a display part exposed through the opening portion to display the effective image, a first peripheral part overlapped with the first curved-line part, and a second peripheral part overlapped with the second curved-line part. The display area and the first peripheral part are separated by a first boundary line having a same curvature as the first curved-line part, and the display part and the second peripheral part are separated by a second boundary line having a same curvature as the second curved-line part. The display module may further comprises a signal processor that scales an image data corresponding to the display area to generate a scaled data corresponding to the display part, and a display panel driver that converts the scaled data to an effective data voltage and applies the effective data voltage to the display part. The signal processor may further generate a non-effective image data, the display panel driver converts the non-effective image data to non-effective image data voltages and applies the non-effective image data voltages to the first peripheral part and the second peripheral part, and each of the first peripheral part and the second peripheral part displays a non-effective image. The display area may comprise a plurality of pixels each including a liquid crystal capacitor and a thin film transistor applying the effective data voltage to the liquid crystal capacitor.

The first curved part may have a convex surface on the bottom and the second curved part have a convex surface on the top.

The display part and the first peripheral part may be separated by a first boundary line having a same curvature as the first curved-line part, and the display part and the second peripheral part may be separated by a second boundary line having a same curvature as the second curved-line part. The first boundary line and the second boundary line may have the same curvature Embodiments of the inventive concept provide a display module that includes a display panel having a display area, the display area displaying a first image in a first mode, and a protective member that accommodates the display module, the protective member including a first horizontal part extending in a horizontal direction, a second horizontal part spaced apart from the first horizontal part in a vertical direction to face the first horizontal part, formed below the first horizontal part, and extending in the horizontal direction, and vertical parts connecting the first horizontal part and the second horizontal part to define an opening portion through which the display area is exposed, the display area comprising a main display part that displays an effective image of the first image in the first mode, a first auxiliary display part that displays a first non-effective image of the first image consecutive to the effective image of the first image in the first mode, and a second auxiliary display part that displays a second non-effective image of the first image consecutive to the effective image of the first image in the first mode. The first auxiliary display part and the second auxiliary display part are spaced apart from each other in the vertical direction with respect to the main display part, the main display part and the first auxiliary display part are separated by a first boundary line, substantially extending in the horizontal direction, and having convex surface on the bottom, and the main display part and the second auxiliary display part are separated each other by a second boundary line substantially extending in the horizontal direction and having convex surface on the top.

The first horizontal part may comprise a first inner side and a first outer side, the second horizontal part may comprise a second inner side and a second outer side, and the vertical parts may comprise third inner sides and third outer sides, the first inner side, the second inner side, and the third inner sides, which are connected to each other, form the opening portion.

The first outer side may have a same curvature as the first boundary line and has a concave surface on the top, and the second outer side may have a same curvature as the second boundary line and has a concave surface on the bottom.

The first inner side and the second inner side may be substantially in parallel to each other.

The display module may further comprise a signal processor that scales an image data corresponding to the first image and outputs a scaled data corresponding to the effective image data and the non-effective image data corresponding to the first non-effective image and the second non-effective image.

The display module may further comprise a display panel driver that converts the scaled data to an effective data voltage to apply the effective data voltage to the main display part and converts the non-effective image data to non-effective image data voltages to apply the non-effective image data voltages to the first auxiliary display part and the second auxiliary display part.

The display area may comprise a plurality of pixels each including a liquid crystal capacitor and a thin film transistor applying the effective data voltage to the liquid crystal capacitor.

The first non-effective image and the second non-effective image may display a same color and pattern as the protective member.

The display module may display a second image different from the first image in a second mode, the main display part may display a first partial image of the second image, the first auxiliary display part may display a second partial image of the second image, which is consecutive to the first partial image, and the second auxiliary display part may display a third partial image of the second image, which is consecutive to the first partial image.

The display panel may further comprise a non-display area disposed adjacent to the display area, and the display module may further comprise a protective frame to accommodate the display panel, cover the non-display area, and expose the display area, and a backlight unit to supply light to the display panel.

According to the above, the display device provides the image with the sense of immersion and presence without changing the three-dimensional shape of the flat display panel. When the shape of the protective member that serves as the outer surface of the display device is changed, the changed effective image is displayed on the display surface. The changed effective image provides the sense of immersion and presence to the viewer.

In addition, the display device provides the image with the sense of immersion and presence without changing the three-dimensional shape of the flat display panel and the protective member. The non-effective image is applied to a portion of the pixels area and the effective image is applied to a different portion of the pixel area. The effective image displayed in only the portion of the pixel area provides the sense of immersion and presence to the viewer.

The display device is operated in two modes. The display panel displays the effective image in the first mode regardless of the area of the display surface thereof. In the second mode, the display panel displays the effective image in the partial area and displays the first and second non-effective images in different partial area. That is, the display device provides a wide image in the first mode and provides the image with the presence in the second mode.

BRIEF DESCRIPTION OF THE DRAWINGS

The above and other advantages of the present disclosure will be readily apparent with reference to the following detailed description and accompanying drawings wherein.

DETAILED DESCRIPTION

Figure 1:
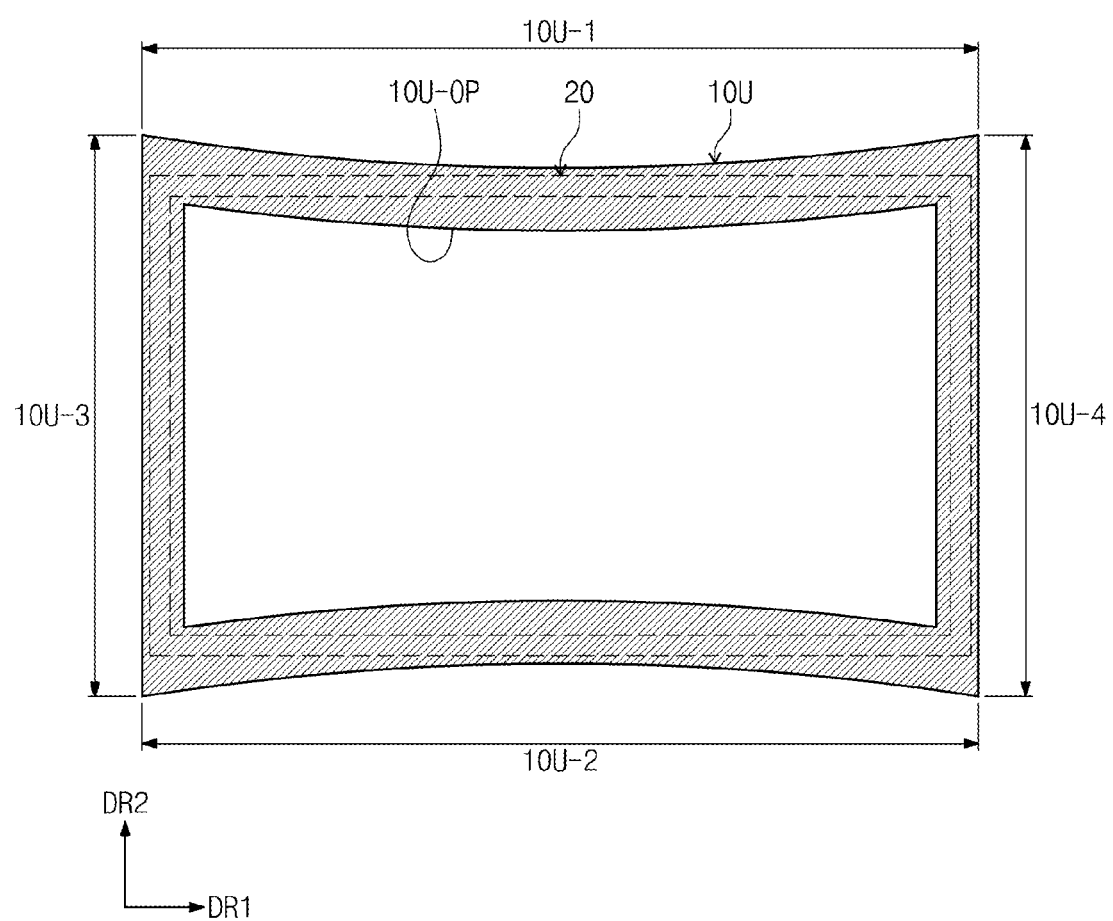
FIG. 1 is a plan view showing a display device according to an exemplary embodiment of the present disclosure.

It will be understood that when an element or layer is described as being "on", "connected to" or "coupled to" another element or layer, the element or layer can be disposed directly on, connected or coupled to the other element or layer, with or without any intervening elements or layers. In contrast, when an element is described as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by the terms. The terms are used to distinguish one element, component, region, layer or section from another region, layer or section. Thus, a first element, component, region, layer or section described herein could be renamed as a second element, component, region, layer or section without departing from the teachings of the present disclosure.

Spatially relative terms, such as "beneath", "below", "lower", "above", "upper" and the like, may be used herein to describe an element or feature's spatial relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both above and below orientation. The device may also be oriented (rotated 90 degrees or at other orientations) and the spatially relative descriptors used herein should be interpreted accordingly.

The terminology used herein is for the purpose of describing certain embodiments and is not intended to be limit the scope of the present disclosure. As used herein, the singular forms, "a", "an" and "the" include the plural forms as well, unless the context clearly expresses otherwise. It will be further understood that the terms "includes" and/or "including", as used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and should not be interpreted in an idealized or overly formal sense unless otherwise expressly so defined herein.

Hereinafter, embodiments of the present invention will be explained in detail with reference to the accompanying drawings.

Figure 2:
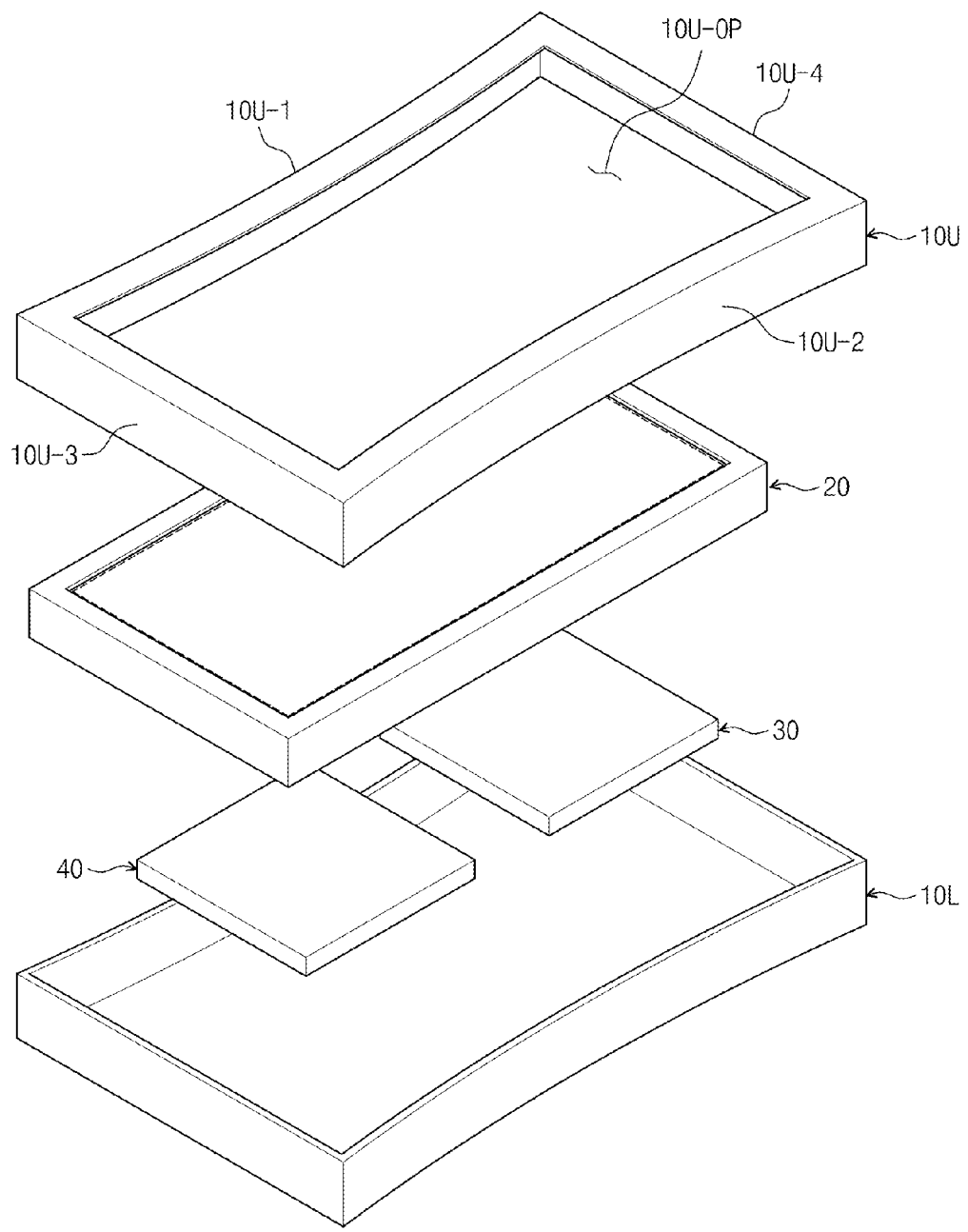
FIG. 2 is an exploded perspective view showing the display device shown in FIG. 1.
Figure 3:
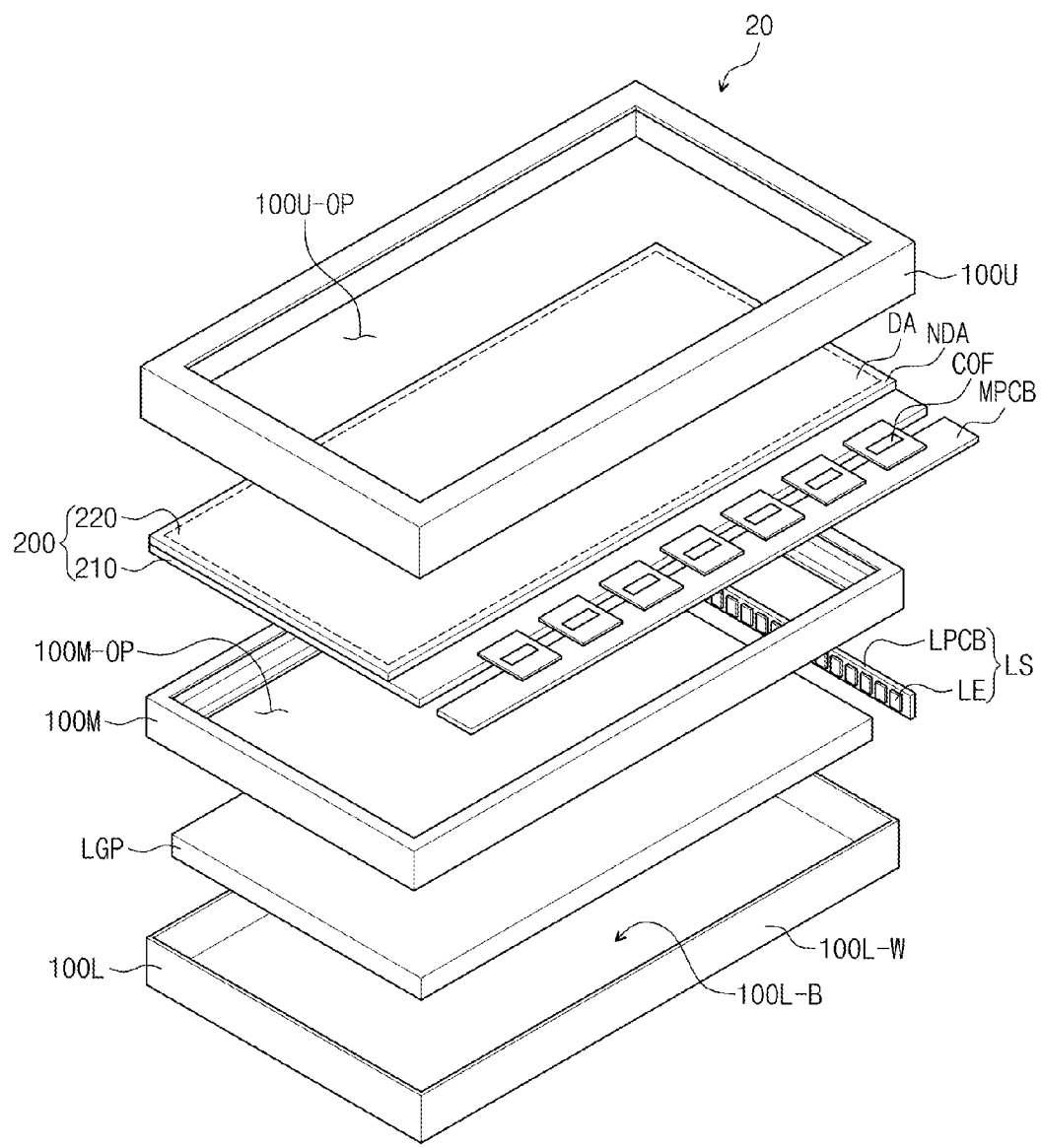
FIG. 3 is an exploded perspective view showing a display module shown in FIG. 2.

FIG. 1 is a plan view showing a display device according to an exemplary embodiment of the present disclosure, FIG. 2 is an exploded perspective view showing the display device shown in FIG. 1, and FIG. 3 is an exploded perspective view showing a display module shown in FIG. 2.

Referring to FIGS. 1 and 2, the display device includes protective members 10U and 10L, a display module 20, a power supply 30, and a tuner 40. FIGS. 1 and 2 show a television set as a representative example. According to the display device, the configuration of the display device may be changed. For instance, the display device may be a computer monitor that does not have the tuner 40.

As shown in FIGS. 1 and 2, the protective members include an upper protective member 10U and a lower protective member 10L, which are coupled to each other. The upper and lower protective members 10U and 10L form an outer surface of the display device and accommodate other elements therein. The upper and lower protective members 10U and 10L may be formed of plastic, aluminum, or stainless steel.

The upper protective member 10U is disposed on the display module 20. The upper protective member 10U include four parts 10U-1 to 10U-4 that define an opening portion 10U-OP on a display surface of the display module 20. The display surface of the display module 20 displays the image.

The four parts 10U-1 to 10U-4 include a first curved-line part 10U-1, a second curved-line part 10U-2, and connection parts 10U-3 and 10U-4. The connection parts 10U-3 and 10U-4 include a first connection part 10U-3 and a second connection part 10U-4, but the number of the connection parts 10U-3 and 10U-4 should not be limited thereto or thereby. The first curved-line part 10U-1, the second curved-line part 10U-2, the first connection part 10U-3, and the second connection part 10U-4 are integrally formed with each other. According to another exemplary embodiment of the present disclosure, the first curved-line part 10U-1, the second curved-line part 10U-2, the first connection part 10U-3, and the second connection part 10U-4 may be assembled with each other or disassembled from each other.

The first curved-line part 10U-1 substantially extends in a horizontal direction DR1 of the display module 20. The first curved-line part 10U-1 is curved to have concave surface on the top and convex surface on the bottom. The first curved-line part 10U-1 has a substantially same width. That is, an outer side and an inner side of the first curved-line part 10U-1 are curved.

The second curved-line part 10U-2 is disposed to face the first curved-line part 10U-1 and spaced apart from the first curved-line part 10U-1 in the vertical direction DR2. The second curved-line are disposed under the first curved-line part 10U-1. The second curved-line part 10U-2 substantially extends in the horizontal direction DR1 of the display module 20. The second curved-line part 10U-2 is curved to have concave surface on the bottom and convex surface on the top. The first curved-line part 10U-1 has a substantially same width. That is, an outer side and an inner side of the second curved-line part 10U-2 are curved. The first curved-line part 10U-1 and the second curved-line part 10U-2 have a symmetrical shape with respect to the horizontal direction DR1.

The first connection part 10U-3 connects left end portions of the first and the second curved-line parts 10U-1 and 10U-2. The second connection part 10U-4 connects right end portions of the first and the second curved-line parts 10U-1 and 10U-2. The first and the second connection parts 10U-3 and 10U-4 are substantially parallel to the vertical direction DR2.

The lower protective member 10L is disposed under the display module 20, the power supply 30, and the tuner 40. Different from the lower protective member 10L shown in FIG. 2, the lower protective member may include parts that may be assembled with each other or disassembled from each other.

The display module 20 displays images through a predetermined area thereof. The display module 20 is partially exposed through the opening portion 10U-OP above the display surface and partially covered by the upper protective member 10U.

The power supply 30 supplies a source voltage to the display module 20. The power supply 30 converts an alternating current voltage from an external source (not shown) to a direct current voltage. The power supply 30 may include an AC-to-DC converter. The tuner 40 demodulates input broadcasting signal and converts the broadcasting signal to image data suitable for the display module. The display device may further include a sound device.

Referring to FIG. 3, the display module 20 includes protective frames 100U, 100M, and 100L, a display panel 200, backlight units that includes a light source LS and a light guide plate LGP. The backlight units LS and LGP may be omitted according to the kind of the display device.

The display panel 200 receives light from the backlight units LS and LGP and displays the images. The display panel 200 may be a liquid crystal display panel or an electrophoretic display panel. In the present exemplary embodiment, the liquid crystal display panel that includes a first substrate 210, a second substrate 220, and a liquid crystal layer (not shown) disposed between the first and the second substrates 210 and 220 will be described as the display panel 200.

The display panel 200 includes a display area DA in which pixels are arranged and a non-display area NDA in which the pixels are not arranged. The display area DA displays the image. In the image displayed in the display area DA, a portion of the image, which is provided to a viewer through the opening portion 10U-OP of the upper protective member 10U, is defined as an effective image.

The non-display area NDA is disposed adjacent to at least a portion of the display area DA. The don-display area surrounds the display area DA. Pads for driving signals and driving voltages are arranged in the non-display area NDA. The pads may be arranged in a portion of the first substrate 210. The pads arranged in the non-display area NDA are connected to a flexible printed circuit board FPC or chip on film COF. The flexible printed circuit board FPC or chip on film COF electrically connects the display panel 200 and a main printed circuit board MPCB. Active elements, such as driving ICs, may be disposed on the flexible printed circuit board FPC, chip on film COF or the main printed circuit board MPCB.

The protective frames 100U, 100M, and 100L include an upper frame 100U, an intermediate frame 100M, and a lower frame 100L. The protective frames 100U, 100M, and 100L may be formed of plastic, aluminum, or stainless steel.

The upper frame 100U is provided with an opening portion 100U-OP to expose the display area DA of the display panel 200. The opening portion 100-OP of the upper frame 100U may be greater than the opening portion 10U-OP of the upper protective member 10U (refer to FIG. 2). The upper frame 100U protects the non-display area NDA of the display panel 200. The upper frame 100U may be omitted. In this case, the upper protective member 10U directly covers the portion of the display panel 200.

The lower frame 100L is disposed under the display panel 200. The lower frame 100L includes a bottom portion 100L-B with a rectangular shape and a sidewall portion 100L-W extend upward from the bottom portion 100L-B. The sidewall portion 100L-W may be partially removed.

The intermediate frame 100M is disposed between the upper frame 100U and the lower frame 100L. The intermediate frame 100M may have a rectangular frame shape overlapped with the non-display area NDA of the display panel 200. The intermediate frame 100M is provided with an opening portion 100M-OP formed therethrough. The intermediate frame 100M is disposed under the display panel 200 and supports the display panel 200.

The backlight units include a light source LS to generate the light and a light guide plate LGP to guide the light from the light source LS to the display panel 200. The backlight units LS and LGP are inserted into the opening portion 100M-OP of the intermediate frame 100M.

The light source LS includes a printed circuit board LPCB and a plurality of light emitting devices LE mounted on the printed circuit board LPCB. The printed circuit board LPCB includes an insulating layer (not shown) and a wiring layer (not shown). The printed circuit board LPCB extends along a surface, e.g., a light incident surface, of the light guide plate LGP. Each light emitting device LE includes a light emitting diode.

Although not shown in figures, the light source LS may further include active elements mounted on the printed circuit board LPCB to control the light emitting devices LE. The light emitting devices LE may be individually turned on or off in response to a dimming signal.

Figure 4:
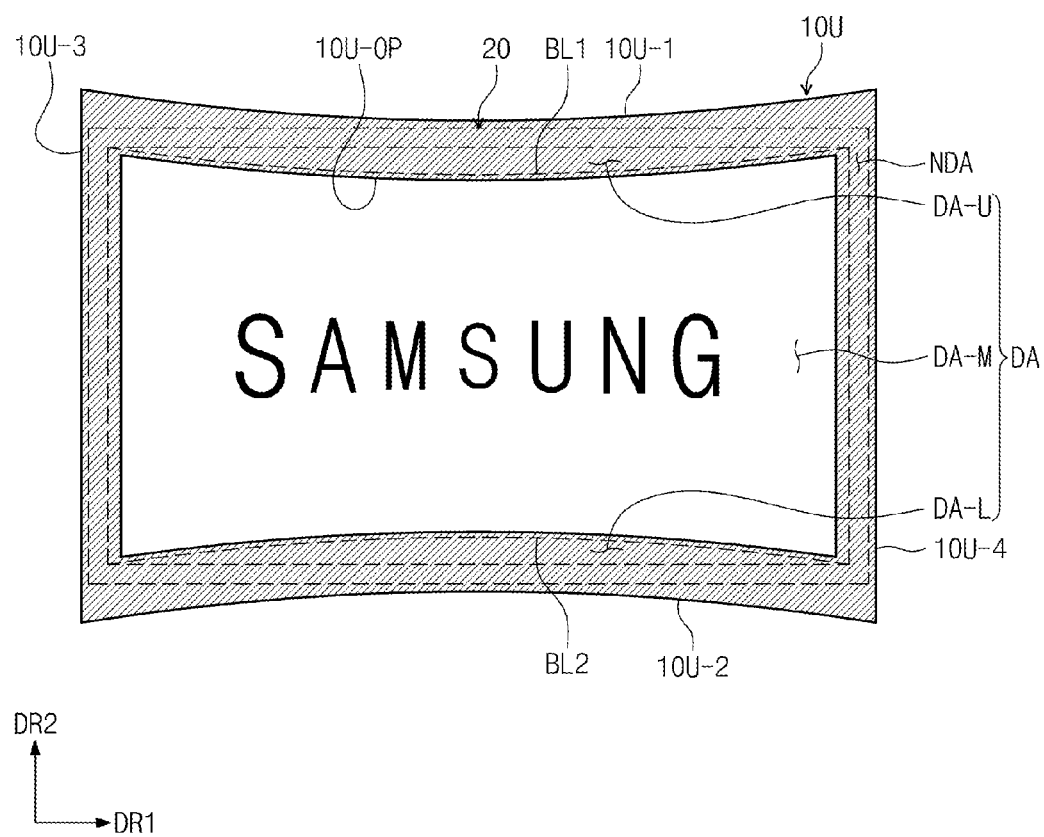
FIG. 4 is a view showing an image displayed in the display device shown in FIG. 1.
Figure 5:
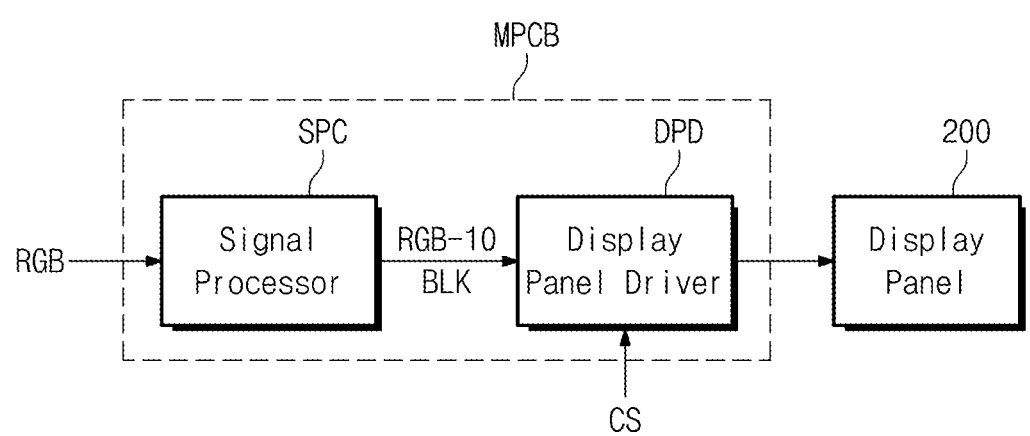
FIG. 5 is a block diagram showing the display module shown in FIG. 3.
Figure 6:
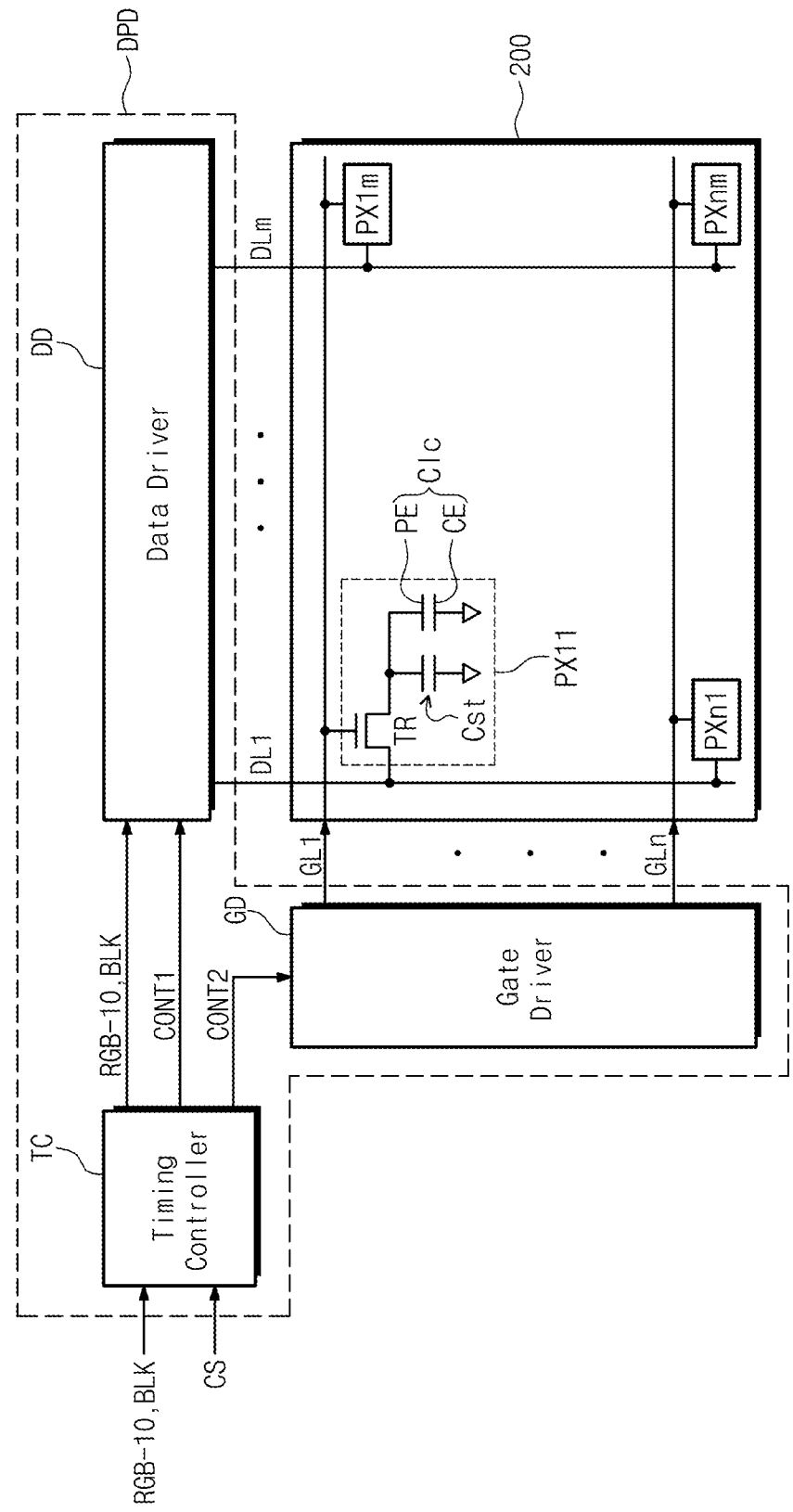
FIG. 6 is a block diagram showing a part of the display module shown in FIG. 5.

FIG. 4 is a view showing an image displayed in the display device shown in FIG. 1, FIG. 5 is a block diagram showing the display module shown in FIG. 3, and FIG. 6 is a block diagram showing a part of the display module shown in FIG. 5.

Referring to FIG. 4, the display area DA of the display panel 200 (refer to FIG. 3) includes a display part DA-M exposed through the opening portion 10U-OP of the upper protective member 10U and first and second peripheral parts DA-U and DA-L covered by the upper protective member 10U. The first peripheral part DA-U is covered by the first curved-line part 10U-1 and the second peripheral part DA-L is covered by the second curved-line part 10U-2.

The display part DA-M and the first peripheral part DA-U are distinct from each other by a first boundary line BL1. The display part DA-M and the second peripheral part DA-L are distinct from each other by a second boundary line BL2. The first boundary line BL1 has a same curvature as the first curved-line part 10U-1. The second boundary line BL2 has a same curvature as the second curved-line part 10U-2. The radius of curvature may be decided depending on a size of the display device. For example, 55-inch display device has a radius of curvature of 9000 mm. A width in the vertical direction DR2 of the display part DA-M exposed through the opening portion 10U-OP is gradually changed depending on the position of the horizontal direction DR1. The width in the vertical direction DR2 of the display part DA-M at a center of the display is minimum. The width in the vertical direction DR2 of the display part DA-M at a edge of the display is maximum. The shape of the effective image displaying area on the display surface is the same as the shape of the display part DA-M.

Due to the first curved-line part 10U-1 and the second curved-line part 10U-2, the display device is perceived by the viewer as the curved display device. Thus, the sense of immersion and presence may be increased to the viewer.

FIG. 4 shows a text image of "SAMSUNG" as the effective image. The first and the second peripheral parts DA-U and DA-L display a non-effective image or do not display any image. The non-effective image may be a single color image of black or white. In the text image, the character of "S" positioned at a center position is more compressed than the character of "S" positioned at a leftmost position. As described above, the effective image may be a scaled image to correspond to the display part DA-M. The scaled image, which corresponds to the shape of the display part DA-M, provides perspective to the viewer. Accordingly, the viewer may more strongly feel the sense of immersion and presence.

Hereinafter, the configuration and the driving method of the display panel will be described in detail with reference to FIGS. 5 and 6.

Referring to FIG. 5, the display module includes a signal processor SPC and a display panel driver DPD. The signal processor SPC and the display panel driver DPD may be driving ICs arranged on the main printed circuit board MPCB.

The signal processor SPC receives image data RGB. The image data are arranged by the frame and stored in a memory. The image data RGB corresponds to data to be displayed in the display area DA (refer to FIG. 4).

The signal processor SPC scales the image data RGB to generate scaled data RGB-10 and applies the scaled data RGB-10 to the display panel driver DPD. The effective image displayed in the display part DA-M (refer to FIG. 4) is generated from the scaled data RGB-10. The signal processor SPC generates non-effective image data BLK together with the scaled data RGB-10. When the effective image is not the scaled image, the non-effective image data BLK may not be generated. In this case, the signal processor SPC may be omitted.

The display panel driver DPD coverts the scaled data RGB-10 to effective data voltages and applies the effective data voltages to the display panel 200. In addition, the display panel driver DPD converts the non-effective image data BLK to non-effective data voltages and applies the non-effective data voltages to the display panel 200.

Referring to FIG. 6, the display panel 200 includes a plurality of pixels PX11 to PXnm, a plurality of gate lines GL1 to GLn, and a plurality of data lines DL1 to DLm. The gate lines GL1 to GLn and the data lines DL1 to DLm are arranged on either the first substrate 210 (refer to FIG. 3) or the second substrate 220 (refer to FIG. 3). The pixels PX11 to PXnm are arranged in a matrix configuration. Each of the pixels PX11 to PXnm is connected to a corresponding gate line of the gate lines GL1 to GLn and a corresponding data line of the data lines DL1 to DLm.

In the present exemplary embodiment, the pixels PX11 to PXnm have the same structure and function, and thus hereinafter, only one pixel PX11 will be describe in detail as a representative example.

The pixel PX11 includes a thin film transistor TR, a liquid crystal capacitor Clc, and a storage capacitor Cst. The thin film transistor TR is electrically connected to the corresponding gate line GL1 and the corresponding data line DL1. The thin film transistor TR outputs the effective data voltage provided through the corresponding data line DL1 in response to the gate signal provided through the gate line GL1.

The liquid crystal capacitor Clc is charged with a voltage corresponding to the effective data voltage output from the thin film transistor TR. According to the amount of electric charges charged in the liquid crystal capacitor Clc, directors of liquid crystal molecules of the liquid crystal layer (not shown) are rearranged. The light incident to the pixel PX11 is transmitted or blocked due to the rearrangement of the directors of the liquid crystal molecules.

The storage capacitor Cst and the liquid crystal capacitor Clc are connected in parallel. The storage capacitor Cst maintains the arrangement of the directors of the liquid crystal molecules of the liquid crystal layer.

The display panel driver DPD includes a timing controller TC, a gate driver GD, and a data driver DD. The timing controller TC receives the scaled data RGB-10 and the non-effective image data BLK and converts the scaled data RGB-10 and the non-effective image data BLK to data appropriate to the display panel 200.

The timing controller TC receives various control signals CS, e.g., a vertical synchronization signal, a horizontal synchronization signal, a main clock signal, a data enable signal, etc., and outputs first and second control signals CONT1 and CONT2.

The gate driver GD applies the gate signals to the gate lines GL1 to GLn in response to the first control signal CONT1. The first control signal CONT1 includes a vertical start signal that starts an operation of the gate driver GD, a gate clock signal that determines an output timing of the gate voltage, and an output enable signal that determines an ON pulse width of the gate voltage.

The data driver DD receives the second control signal CONT2, the scaled data RGB-10, and the non-effective image data BLK. The data driver DD converts the scaled data RGB-10 and the non-effective image data BLK to the effective data voltage and the non-effective data voltage. The data driver DD applies the effective data voltage and the non-effective data voltage to the data lines DL1 to DLm.

The second control signal CONT2 includes a horizontal start signal that starts an operation of the data driver DD, an inversion signal that inverts a polarity of the effective data voltages, and an output indicating signal that determines an output timing of the effective data voltages from the data driver DD.

The scaled data RGB-10 and the non-effective image data BLK are rearranged for a line-by-line driving method. The rearranged data are converted to the effective data voltage and the non-effective data voltage, which correspond to each gate line GL1 to GLn and substantially simultaneously applied to the data lines DL1 to DLm.

The effective data voltage and the non-effective data voltage applied to the data lines DL1 to DLm change the alignment of the directors of the liquid crystal molecules in the pixels PX11 to PXnm. Therefore, the effective image is displayed as shown in FIG. 4 by the combination of the lights passing through the pixels PX11 to PXnm.

Figure 7:
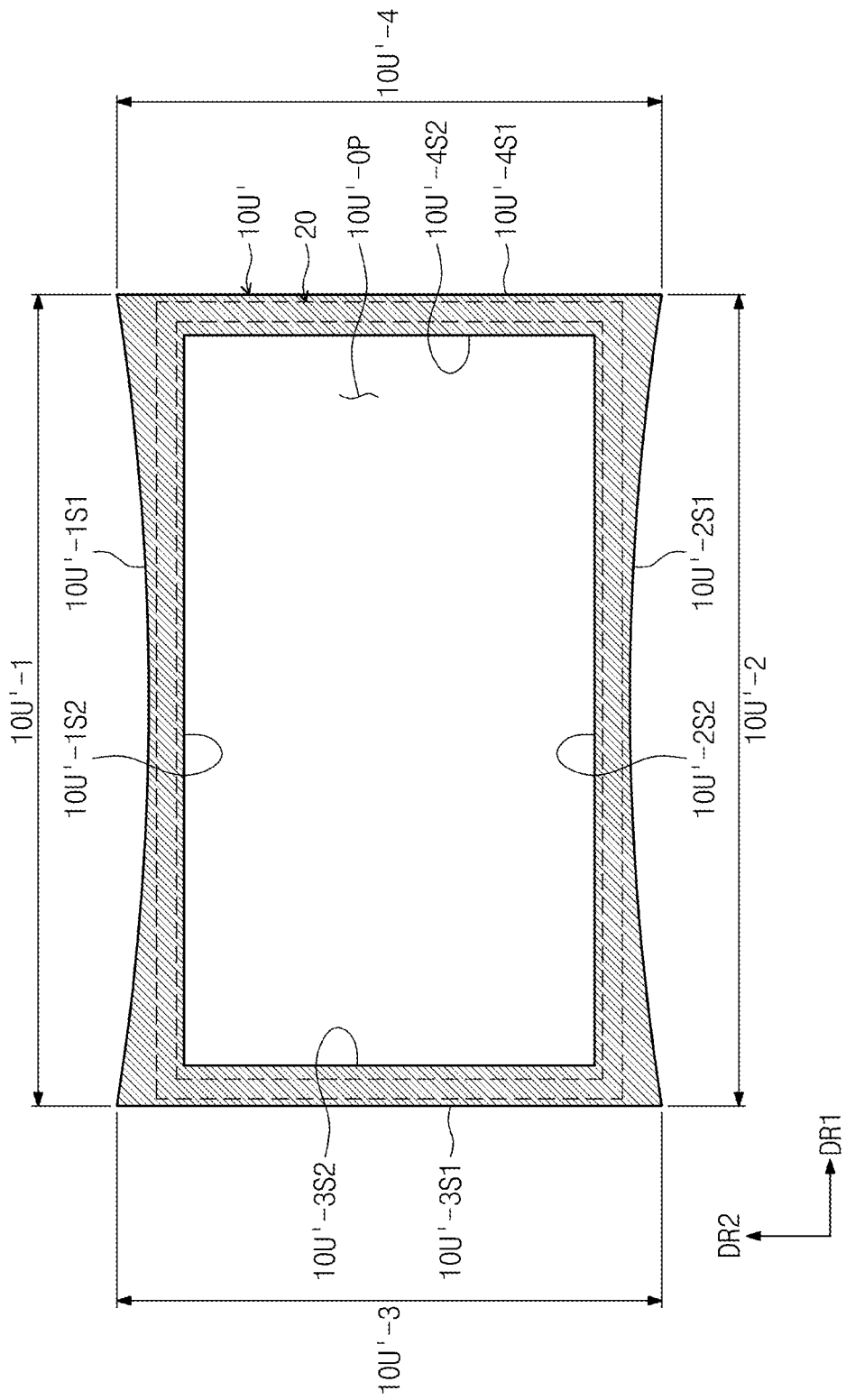
FIG. 7 is a plan view showing a display device according to an exemplary embodiment of the present disclosure.
Figure 8A:
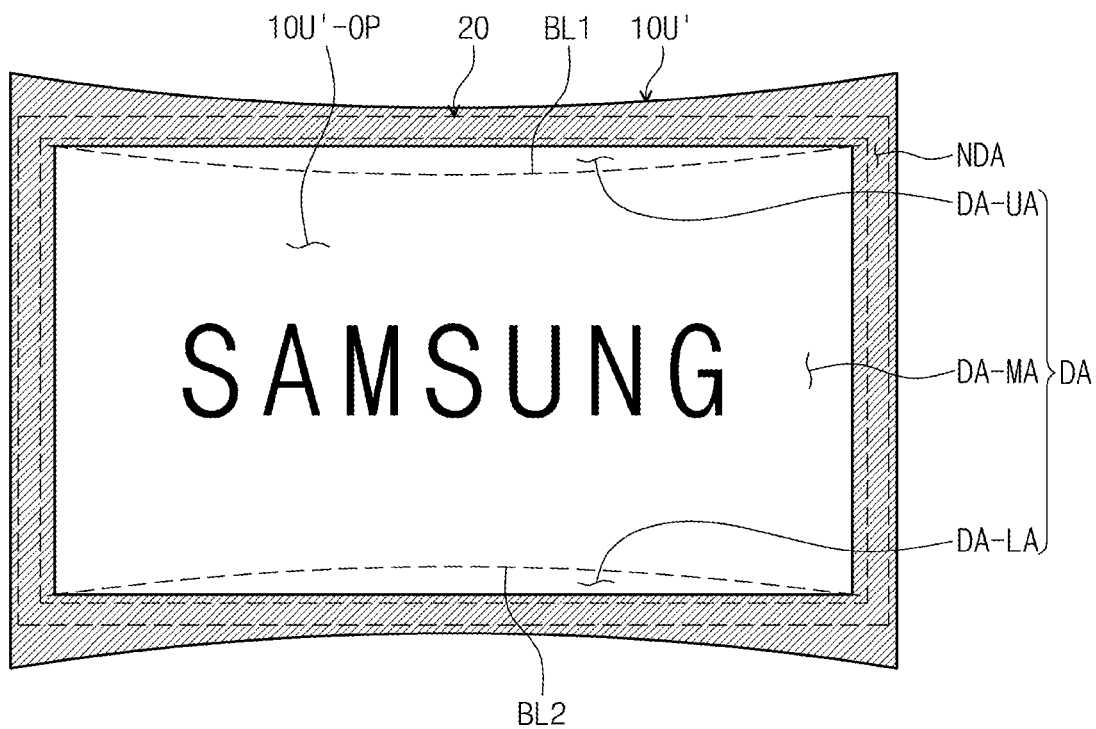
FIGS. 8A and 8B are views respectively showing first and second images displayed in the display device shown in FIG. 7.
Figure 8B:
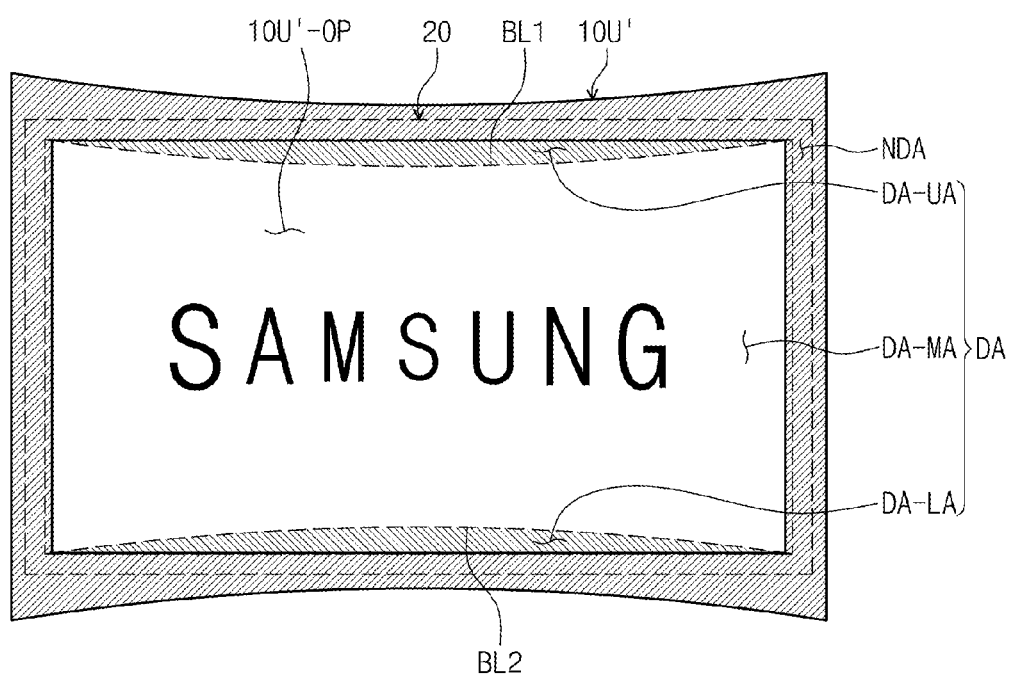
Figure 9:
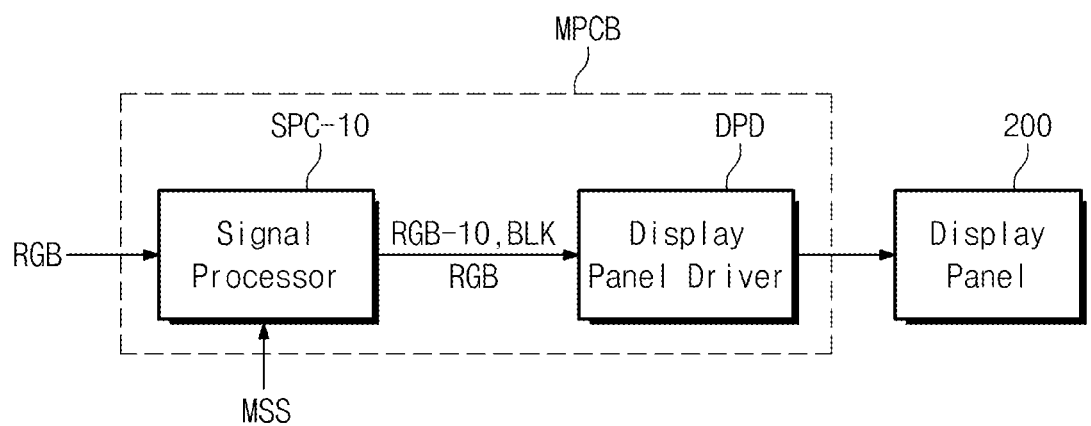
FIG. 9 is a block diagram showing a display module of the display device shown in FIG. 7.

FIG. 7 is a plan view showing a display device according to an exemplary embodiment of the present disclosure, FIGS. 8A and 8B are views respectively showing first and second images displayed in the display device shown in FIG. 7, and FIG. 9 is a block diagram showing a display module of the display device shown in FIG. 7. In FIGS. 7 to 9, the same reference numerals denote the same elements in FIGS. 1 to 6, and thus detailed descriptions of the same elements will be omitted.

Referring to FIG. 7, the display device includes an upper protective member 10U' and a display module 20. The upper protective member 10U' includes four parts 10U'-1 to 10U'-4 through which the display module 20 is exposed. The upper protective member 10U' covers the upper frame 100U (refer to FIG. 3) of the display module 20 and the opening portion 10U'-OP of the upper protective member 10U' exposes the display area DA of the display panel 200 (refer to FIG. 3) included in the display module 20.

The four parts 10U'-1 to 10U'-4 include a first horizontal part 10U'-1, a second horizontal part 10U'-2, a first vertical part 10U'-3, and a fourth vertical part 10U'-4. The first horizontal part 10U'-1 substantially extends in the horizontal direction DR1 of the display module 20. The second horizontal part 10U'-2 is disposed to face the first horizontal part 10U'-1 and spaced apart from the first horizontal part 10U'-1 in the vertical direction DR2. The second horizontal part 10U'-2 is disposed under the first horizontal part 10U'-1. The first vertical part 10U'-3 connects left end portions of the first and the second horizontal parts 10U'-1 and 10U'-2. The second vertical part 10U'-4 connects right end portions of the first and the second horizontal parts 10U'-1 and 10U'-2. The first and the second vertical parts 10U'-3 and 10U'-4 are spaced apart from each other in the horizontal direction DR1 and face each other.

The first horizontal part 10U'-1, the second horizontal part 10U'-2, the first vertical part 10U'-3, and the second vertical part 10U'-4 include outer sides 10U'-1S1 to 10U'-4S1 and inner sides 10U'-1S2 to 10U'-4S2, respectively. The opening portion 10U'-OP is defined by inner sides 10U'-1S2 to 10U'-4S2.

The inner side 10U'-1S2 (hereinafter, referred to as first inner side) of the first horizontal part 10U'-1 and the inner side 10U'-2S2 (hereinafter, referred to as second inner side) of the second horizontal part 10U'-2 are substantially parallel to each other in the horizontal direction DR1. The inner side 10U'-3S2 (hereinafter, referred to as third inner side) of the first vertical part 10U'-3 and the inner side 10U'-4S2 (hereinafter, referred to as fourth inner side) of the second vertical part 10U'-4 are substantially parallel to each other in the vertical direction DR2. The opening portion 10U'-OP has a rectangular shape defined by the first inner side 10U'-1S2, the second inner side 10U'-2S2, the third inner side 10U'-3S2, and the fourth inner side 10U'-4S2, which are connected to each other.

The outer side 10U'-1S1 (hereinafter, referred to as first outer side) of the first horizontal part 10U'-1 is curved to have concave surface on the top and the outer side 10U'-2S1 (hereinafter, referred to as second outer side) of the second horizontal part 10U'-2 is curved to have concave surface on the bottom. The outer side 10U'-3S1 (hereinafter, referred to as third outer side) of the first vertical part 10U'-3 and the outer side 10U'-4S1 (hereafter, referred to as fourth outer side) of the second vertical part 10U'-4 are substantially parallel to each other in the vertical direction DR2.

The shape of the upper protective member 10U' should not be limited to described exemplary embodiment of the present disclosure. In other embodiment of the present disclosure, the first outer side 10U'-1S1 and the second outer side 10U'-2S1 may have other shape. For example, the first outer side 10U'-1S1 and the second outer side 10U'-2S1 may have a straight line. In other words, the first outer side 10U'-1S1, the second outer side 10U'-2S1, the third outer side 10U'-3S1, and the fourth outer side 10U'-4S1 connected to each other form a rectangular shape.

The images are displayed in the display area DA of the display module 20. The display module 20 may be operated in two modes. The display panel 200 displays a first image in a first mode and displays a second image different from the first image in a second mode. The first image includes the effective image and the second image includes the effective image and the non-effective image. The display module 20 may be operated only in the second mode. Thus the display module 20 is not required to be selectively operated in the first and the second modes.

FIG. 8A shows the text image of "SAMSUNG", which is not scaled, as the first image. The first image displayed in the first mode may be the effective image. The display area DA is divided into a main display part DA-MA, a first auxiliary display part DA-UA, and a second auxiliary display part DA-LA. The first and the second auxiliary display parts DA-UA and DA-LA are spaced apart from each other in the vertical direction DR2 while interposing the main display part DA-MA therebetween.

The main display part DA-MA and the first auxiliary display part DA-UA are separated by the first boundary line BL1, and the main display part DA-MA and the second auxiliary display part DA-LA are separated by the second boundary line BL2. The first boundary line BL1 and the first outer side 10U'-1S1 have the substantially same curvature and the second boundary line BL2 and the second outer side 10U'-2S1 have the substantially same curvature. The radius of curvature of the first boundary line BL1 and the second boundary line BL2 may be decided depending on a size of the display device. For example, 55-inch display device has a radius of curvature of 9000 mm. The radius of curvature each of the first boundary line BL1 and the second boundary line BL2 may be 9000 mm.

One end portion of the first boundary line BL1 meets one end portion of the first inner side 10U'-1S2 in a plan view, and the other end portion of the first boundary line BL1 meets the other one end portion of the first inner side 10U'-1S2 in a plan view. One end portion of the second boundary line BL2 meets one end portion of the second inner side 10U'-2S2 in a plan view, and the other end portion of the second boundary line BL2 meets the other one end portion of the second inner side 10U'-2S2 in a plan view.

In the first mode, the main display part DA-MA, the first auxiliary display part DA-UA, and the second auxiliary display part DA-LA display a partial image of the first image. As shown in FIG. 8A, the main display part DA-MA displays the text image of "SAMSUNG" as the first partial image. The first auxiliary display part DA-UA displays a background image as a second partial image consecutive to the first partial image, and the second auxiliary display part DA-LA displays a background image as a third partial image consecutive to the first partial image.

FIG. 8B shows the text image of "SAMSUNG", which is scaled, as a second image. In the second mode, the main display part DA-MA displays the effective image as the scaled text image of "SAMSUNG". The first and the second auxiliary display parts DA-UA and DA-LA display a first non-effective image and a second non-effective image, respectively.

The first and the second non-effective images do not display image information and may single color image or patterned images. The first and the second non-effective images may have the same color and pattern as the upper protective member 10U. In this case, the first and second auxiliary display parts DA-UA and DA-LA are perceived by the viewer as a portion of the upper protective member 10U. Due to the first non-effective image displayed in the first auxiliary display part DA-UA and the second non-effective image displayed in the second auxiliary display part DA-LA, the first horizontal part 10U'-1 and the second horizontal part 10U'-2 shown in FIG. 8B are recognized as the first curved-line part 10U-1 and the second curved-line part 10U-2 shown in FIG. 1.

As described above, since the shape of the display surface of the main display part DA-MA is deformed by the first and the second auxiliary display parts DA-UA and DA-LA, the viewer recognizes the display device as the curved display device. Thus, the sense of immersion and presence may be provided to the viewer. Accordingly, the viewer may more strongly feel the sense of immersion and presence through the scaled effective image as described with reference to FIGS. 1 to 6.

According to another exemplary embodiment, the effective image may be a non-scaled image. According to another exemplary embodiment, the effective image of the second mode corresponds to the first partial image of the first mode. According to another exemplary embodiment, the second and third partial images of the first mode are replaced with the first and second non-effective images of the second mode, respectively.

Referring to FIG. 9, the display module includes a signal processor SPC-10 and a display panel driver DPD. The signal processor SPC-10 receives image data RGB and a mode selection signal MSS. The mode selection signal MSS is generated by a viewer's input operation.

The signal processor SPC-10 outputs the image data RGB to the display panel driver DPD in the first mode in response to the mode selection signal MSS. The image data RGB are not scaled. The display panel driver DPD converts the image data RGB to the effective data voltage and applies the effective data voltage to the display panel 200.

The signal processor SPC-10 generates the scaled data RGB-10 and the non-effective image data BLK in the second mode and outputs the scaled data RGB-10 and the non-effective image data BLK to the display panel driver DPD. The non-effective image data BLK includes a first non-effective image data corresponding to the first non-effective image and a second non-effective image data corresponding to the second non-effective image. The display panel driver DPD converts the scaled data RGB-10 to the effective data voltage and the non-effective image data BLK to the non-effective data voltage and applies the effective data voltage and the non-effective data voltage to the display panel 200.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
 a display module that includes a display panel to display an effective image in a portion of a display area; and
 a protective member that accommodates the display module, the protective member including:
  a first curved-line part extending substantially in a horizontal direction on a display surface of the display module and curved to be concaved in a vertical direction perpendicular to the horizontal direction,
  a second curved-line part spaced apart from the first curved-line part to face the first curved-line part in the vertical direction, extending substantially in the horizontal direction, and curved to be convex in the vertical direction, and
  connection parts that connect the first curved-line part and the second curved-line part to define an opening portion through which the portion of the display area is exposed,
 wherein the display area comprises a display part exposed through the opening portion to display the effective image, a first peripheral part overlapped with the first curved-line part, and a second peripheral part overlapped with the second curved-line part.

2. The display device of claim 1, wherein the display part and the first peripheral part are separated by a first boundary line having a same curvature as the first curved-line part, and the display part and the second peripheral part are separated by a second boundary line having a same curvature as the second curved-line part.

3. The display device of claim 1, wherein the display module further comprises:
   a signal processor that scales an image data corresponding to the display area to generate a scaled data corresponding to the display part; and
   a display panel driver that converts the scaled data to an effective data voltage and applies the effective data voltage to the display part.

4. The display device of claim 3, wherein the signal processor further generates a non-effective image data, the display panel driver converts the non-effective image data to non-effective image data voltages and applies the non-effective image data voltages to the first peripheral part and the second peripheral part, and each of the first peripheral part and the second peripheral part displays a non-effective image.

5. The display device of claim 3, wherein the display area comprises a plurality of pixels each including a liquid crystal capacitor and a thin film transistor applying the effective data voltage to the liquid crystal capacitor.

6. The display device of claim 1, wherein the display panel further comprises a non-display area disposed adjacent to the display area, and the display module further comprises a protective frame to accommodate the display panel, cover the non-display area, and expose the display area and a backlight unit to supply light to the display panel.

7. The display device of claim 6, wherein the display panel comprises:
   a first display substrate;
   a second display substrate facing the first display substrate; and
   a liquid crystal layer disposed between the first display substrate and the second display substrate.

8. The display device of claim 1, wherein the display part and the first peripheral part are separated by a first boundary line having a same curvature as the first curved-line part, and the display part and the second peripheral part are separated by a second boundary line having a same curvature as the second curved-line part, and
   wherein the first boundary line and the second boundary line have the same curvature.

9. A display device comprising:
   a display module that includes a display panel having a display area, the display area displaying a first image in a first mode; and
   a protective member that accommodates the display module, the protective member including:
      a first horizontal part extending in a horizontal direction,
      a second horizontal part spaced apart from the first horizontal part in a vertical direction to face the first horizontal part, formed below the first horizontal part, and extending in the horizontal direction, and
      vertical parts connecting the first horizontal part and the second horizontal part to define an opening portion through which the display area is exposed, the display area comprising:
   a main display part that displays an effective image of the first image in the first mode;
   a first auxiliary display part that displays a first non-effective image of the first image consecutive to the effective image of the first image in the first mode; and
   a second auxiliary display part that displays a second non-effective image of the first image consecutive to the effective image of the first image in the first mode,
   wherein the first auxiliary display part and the second auxiliary display part are spaced apart from each other in the vertical direction with respect to the main display part, the main display part and the first auxiliary display part are separated by a first boundary line substantially extending in the horizontal direction and being concave in the vertical direction, and the main display part and the second auxiliary display part are separated by a second boundary line substantially extending in the horizontal direction and being convex in the vertical direction.

10. The display device of claim 9, wherein the first horizontal part comprises a first inner side and a first outer side, the second horizontal part comprises a second inner side and a second outer side, and the vertical parts comprise third inner sides and third outer sides, the first inner side, the second inner side, and the third inner sides, which are connected to each other, form the opening portion.

11. The display device of claim 10, wherein the first outer side has a same curvature as the first boundary line and is concave in the vertical direction, and the second outer side has a same curvature as the second boundary line and is convex in the vertical direction.

12. The display device of claim 10, wherein the first inner side and the second inner side are substantially in parallel to each other.

13. The display device of claim 9, wherein the display module further comprises a signal processor that scales an image data corresponding to the first image and outputs a scaled data corresponding to the effective image data and the non-effective image data corresponding to the first non-effective image and the second non-effective image.

14. The display device of claim 13, wherein the display module further comprises a display panel driver that converts the scaled data to an effective data voltage to apply the effective data voltage to the main display part and converts the non-effective image data to non-effective image data voltages to apply the non-effective image data voltages to the first auxiliary display part and the second auxiliary display part.

15. The display device of claim 14, wherein the display area comprises a plurality of pixels each including a liquid crystal capacitor and a thin film transistor applying the effective data voltage to the liquid crystal capacitor.

16. The display device of claim 9, wherein the first non-effective image and the second non-effective image display a same color and pattern as the protective member.

17. The display device of claim 9, wherein the display module displays a second image different from the first image in a second mode, the main display part displays a first partial image of the second image, the first auxiliary display part displays a second partial image of the second image, which is consecutive to the first partial image, and the second auxiliary display part displays a third partial image of the second image, which is consecutive to the first partial image.

18. The display device of claim 9, wherein the display panel further comprises a non-display area disposed adjacent to the display area, and the display module further comprises a protective frame to accommodate the display panel, cover the non-display area, and expose the display area and a backlight unit to supply light to the display panel.

19. The display device of claim 18, wherein the display panel comprises:
   a first display substrate;
   a second display substrate facing the first display substrate; and a liquid crystal layer disposed between the first display substrate and the second display substrate.

\* \* \* \* \*